(12) United States Patent
Matsushita et al.

(10) Patent No.: US 12,555,866 B2
(45) Date of Patent: Feb. 17, 2026

(54) POWER STORAGE DEVICE

(71) Applicant: TOYOTA JIDOSHA KABUSHIKI KAISHA, Toyota (JP)

(72) Inventors: Taro Matsushita, Toyokawa (JP); Tadahiro Kondo, Toyota (JP); Shotaro Ishikawa, Miyoshi (JP); Koichiro Kishi, Toyota (JP); Kenta Watanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 17/325,852

(22) Filed: May 20, 2021

(65) Prior Publication Data
US 2021/0376421 A1 Dec. 2, 2021

(30) Foreign Application Priority Data
Jun. 2, 2020 (JP) .................................. 2020-096116

(51) Int. Cl.
*H01M 50/291* (2021.01)
*H01M 10/613* (2014.01)
*H01M 10/625* (2014.01)
*H01M 10/647* (2014.01)
*H01M 50/209* (2021.01)
(Continued)

(52) U.S. Cl.
CPC ....... *H01M 50/291* (2021.01); *H01M 10/613* (2015.04); *H01M 10/625* (2015.04);
(Continued)

(58) Field of Classification Search
CPC ............. H01M 50/291; H01M 50/209; H01M 2220/20; H01M 50/249; H01M 10/613;
(Continued)

(56) References Cited

U.S. PATENT DOCUMENTS

2011/0003187 A1* 1/2011 Graaf ................ H01M 10/6555
429/120
2012/0021260 A1* 1/2012 Yasui .................. H01M 10/615
429/71
(Continued)

FOREIGN PATENT DOCUMENTS

| CN | 103427106 A | 12/2013 | |
| CN | 108631022 A | 10/2018 | |
| DE | 102014211821 A1 * | 12/2015 | .......... H01M 2/0217 |
| JP | 2009110832 A * | 5/2009 | |
| JP | 2015-60759 A | 3/2015 | |
| JP | 2018032519 A * | 3/2018 | ............. Y02E 60/10 |
| WO | WO-2013000548 A1 * | 1/2013 | .......... B60L 11/1864 |

OTHER PUBLICATIONS

DE-102014211821-A1—English translation via Espacenet, accessed Jan. 18, 2025 (Year: 2025).*

(Continued)

*Primary Examiner* — Allison Bourke
*Assistant Examiner* — Bethany C Garcia
(74) *Attorney, Agent, or Firm* — Sughrue Mion, PLLC (57) ABSTRACT

A power storage device includes a power storage stack and a housing case. In the power storage stack, a plurality of unit cells and a plurality of spacers are alternately stacked in a first direction. A first support surface of each spacer among the plurality of spacers is angled corresponding to and is in contact with a first tapered surface of the unit cell that is adjacent to the spacer in the first direction. A second support surface of each spacer among the plurality of spacers is angled corresponding to and is in contact with a second tapered surface of the unit cell that is adjacent to the spacer in the first direction. The plurality of spacers are each formed of a thermoplastic resin.

3 Claims, 6 Drawing Sheets

(51) Int. Cl.
*H01M 50/249* (2021.01)
*H01M 50/293* (2021.01)

(52) U.S. Cl.
CPC ....... *H01M 10/647* (2015.04); *H01M 50/209* (2021.01); *H01M 50/249* (2021.01); *H01M 50/293* (2021.01); *H01M 2220/20* (2013.01)

(58) Field of Classification Search
CPC ............. H01M 10/625; H01M 10/647; H01M 10/6555; H01M 10/6554; H01M 10/615; H01M 10/653; H01M 10/6551; H01M 10/6557; H01M 10/658; H01M 50/289–293; H01M 50/102–105; H01M 50/10–105; H01M 50/24–249; H01M 4/02–2300/0097; Y02E 60/10; Y02P 70/50; B60L 50/64
See application file for complete search history.

(56) References Cited

U.S. PATENT DOCUMENTS

| | | | |
|---|---|---|---|
| 2013/0309539 A1* | 11/2013 | Yoshioka | H01G 11/10 29/25.03 |
| 2018/0269544 A1* | 9/2018 | Choi | H01M 10/613 |
| 2020/0411819 A1* | 12/2020 | Seki | H01M 50/269 |
| 2021/0359370 A1* | 11/2021 | Wang | H01M 50/291 |

OTHER PUBLICATIONS

JP-2018032519-A—English translation via Espacenet, accessed Jan. 18, 2025 (Year: 2025).*
WO-2013000548-A1—English translation via Espacenet, accessed Jan. 19, 2025 (Year: 2025).*

* cited by examiner

POWER STORAGE DEVICE

This nonprovisional application is based on Japanese Patent Application No. 2020-096116 filed on Jun. 2, 2020 with the Japan Patent Office, the entire content of which is hereby incorporated by reference.

BACKGROUND

Field

The present disclosure relates to a power storage device to be mounted on a vehicle.

Description of the Background Art

Japanese Patent Laying-Open No. 2018-32519 discloses a configuration of a power storage device. The power storage device disclosed in Japanese Patent Laying-Open No. 2018-32519 is a cell module, which includes a cell stack and a housing case. The cell stack includes a stack of cells in which multiple rectangular cells are stacked in the direction of thickness of the stack of cells, and a pair of end plates. The end plates are disposed at the opposing ends of the cell stack in the stacking direction of the cells. One least one of the end plates has a stack-facing surface that is angled so that the dimension of the housing case in the stacking direction of the cells decreases toward the lower end. The accommodating space has case-facing surfaces that are angled so that the dimension of the accommodating space in the stacking direction of the cells decreases. Since the stack-facing surface and the case-facing surface, which are facing each other, are angled, a constraining load can be applied to the cell stack by pressing a cell stack in place into the accommodating space.

SUMMARY

As with the power storage device disclosed in Japanese Patent Laying-Open No. 2018-32519, a constraining load is applied to a power storage stack in a conventional power storage device. Heat is thus easily transferred among the unit cells included in the power storage stack. Due to this, if one of the unit cells is abnormally heated, heat is transferred from the abnormally-heated unit cell to other unit cells. If these other unit cells are heated, they may also be heated abnormally. In this manner, a chain of heat generation by unit cells can occur in a conventional power storage device.

The present disclosure is made in view of the above problem, and an object of the present disclosure is to provide a power storage device which can inhibit, when one of unit cells included in a power storage stack is abnormally heated, conduction of the heat from the unit cell to other unit cells.

A power storage device according to the present disclosure includes a power storage stack and a housing case. In the power storage stack, a plurality of unit cells and a plurality of spacers are alternately stacked in a first direction. The housing case accommodates the power storage stack. The power storage stack is constrained in the first direction within the housing case. Each unit cell among the plurality of unit cells has a first tapered surface and a second tapered surface. The first tapered surface and the second tapered surface are angled so that a dimension between the first tapered surface and the second tapered surface decreases toward one side of the second direction intersecting with the first direction, the first tapered surface and the second tapered surface forming opposing end surfaces of the unit cell in the first direction. Each spacer among the plurality of spacers has a first support surface and a second support surface. The first support surface and the second support surface form opposing end surfaces of the spacer in the first direction. The first support surface of each spacer among the plurality of spacers is angled corresponding to and is in contact with the first tapered surface of a unit cell adjacent to the spacer on one side of the first direction. The second support surface of each spacer among the plurality of spacers is angled corresponding to and is in contact with the second tapered surface of a unit cell adjacent to the spacer on the other side of the first direction. The plurality of spacers are each formed of a thermoplastic resin.

A friction force is generated between the tapered surface of the unit cell and the support surface of the spacer formed of the thermoplastic resin. This inhibits the unit cell from being displaced out of position in the second direction by a constraining force acting on the power storage stack. The power storage stack can, in turn, maintain the constraining force bearing state. Furthermore, if any one of the plurality of unit cells is abnormally heated, the support surface of the spacer, formed of the thermoplastic resin, adjacent to the unit cell is thermally distorted. This reduces a friction coefficient between the support surface of the spacer and the tapered surface of the unit cell. The constraining force is applied to the heated unit cell, which, in turn, slides on the support surface of the spacer and is displaced out of position in the second direction. The heated unit cell being displaced out of position reduces the constraining force. The reduction in the constraining force can inhibit the conduction of heat from the abnormally heated unit cell to other unit cells within the power storage stack.

In the power storage device according to one embodiment of the present disclosure, the power storage stack has a first end surface and a second end surface. The first end surface and the second end surface form opposing end surfaces of the power storage stack in the first direction. The first end surface of the power storage stack is formed of the first tapered surface of the unit cell that is disposed on one end of the power storage stack in the first direction. The second end surface of the power storage stack is formed of the second tapered surface of a unit cell that is disposed on the other end of the power storage stack in the first direction. The housing case has a first inner surface and a second inner surface. The first inner surface and the second inner surface are facing each other in the first direction. The first inner surface includes a first angled portion. The first angled portion is angled corresponding to the first tapered surface. The second inner surface includes a second angled portion. The second angled portion is angled corresponding to the second tapered surface. The power storage stack is held by the housing case, with the first end surface in contact with the first angled portion and the second end surface in contact with the second angled portion.

This allows the power storage stack to be held within the housing case, without having to provide another member, such as an end plate, between the inner surface of the housing case and the opposing end surfaces of the power storage stack in the first direction.

The power storage device according to one embodiment of the present disclosure further includes a cooler. The cooler is disposed between the bottom of the housing case and the power storage stack. The cooler cools the plurality of unit cells. On the one side of the second direction, the bottom is facing the power storage stack. The plurality of spacers are each positioned in the second direction by being in contact with the cooler.

The plurality of spacers being positioned in the second direction as such stabilizes the position of the entirety of the power storage stack in the second direction, which, in turn, improves the reliability of the power storage device.

In the power storage device according to one embodiment of the present disclosure, the housing case has a bottom. On one side of the second direction, the bottom is facing the power storage stack. The plurality of spacers are each positioned in the second direction by being in contact with the bottom.

The plurality of spacers being positioned in the second direction as such stabilizes the position of the entirety of the power storage stack in the second direction, which, in turn, improves the reliability of the power storage device.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, a power storage device according to a respective embodiment will be described, with reference to the accompanying drawings. In the following description of embodiments, the same reference sign is given to the same or corresponding part in the figures, and description thereof will not be repeated.

Embodiment 1

Figure 1:
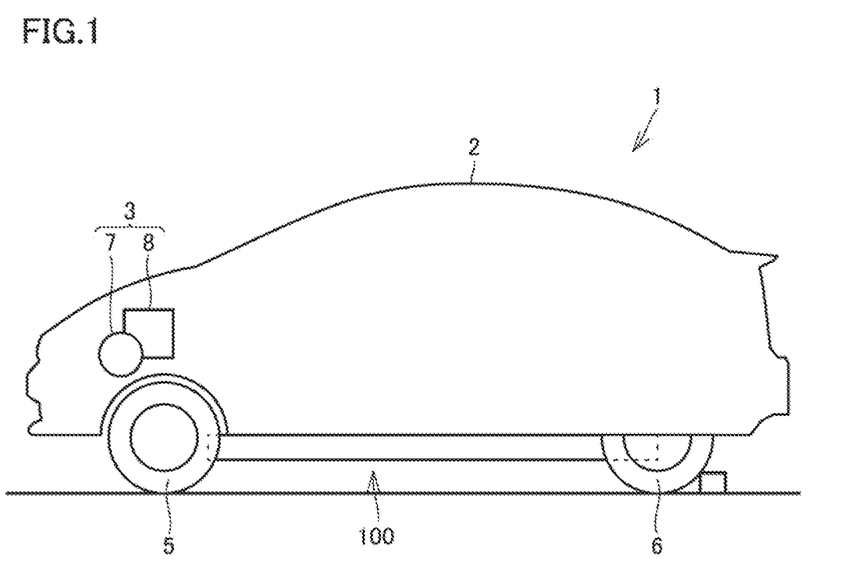
FIG. 1 is a schematic view illustrating a vehicle which includes a power storage device according to Embodiment 1.

FIG. 1 is a schematic view illustrating a vehicle which includes a power storage device according to Embodiment 1. Referring to FIG. 1, a vehicle 1 is described which includes a power storage device 100 according to Embodiment 1.

The vehicle 1 includes a vehicle body 2, a driving gear 3, front wheels 5, rear wheels 6, and power storage device 100. An engine compartment, a boarding space, and a luggage room are formed within the vehicle body 2. The engine compartment is formed on the front side of the vehicle 1. The boarding space is formed on the rear side of the engine compartment. The luggage room is formed behind the boarding space.

The driving gear 3 is accommodated within the engine compartment. The driving gear 3 includes a rotating electric machine 7 and a power control unit (PCU) 8. The PCU 8 includes an inverter and a converter. The PCU 8 is electrically connected to the power storage device 100 and the rotating electric machine 7.

The PCU 8 boosts the voltage of a direct-current (DC) power supplied from the power storage device 100, further converts the DC power into an alternating-current (AC) power and supplies the AC power to the rotating electric machine 7.

Using the AC power supplied from the PCU 8, the rotating electric machine 7 generates a driving force for rotating the front wheels 5. Note that the vehicle 1 is an electric-powered vehicle, such as electric vehicles and hybrid vehicles.

Figure 2:
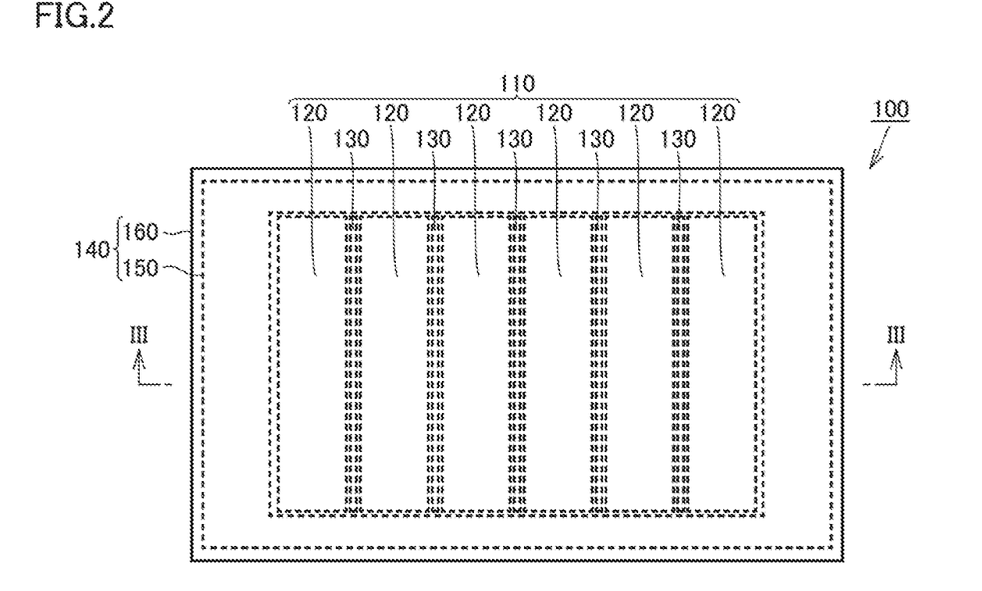
FIG. 2 is a schematic plan view of the power storage device according to Embodiment 1.
Figure 3:
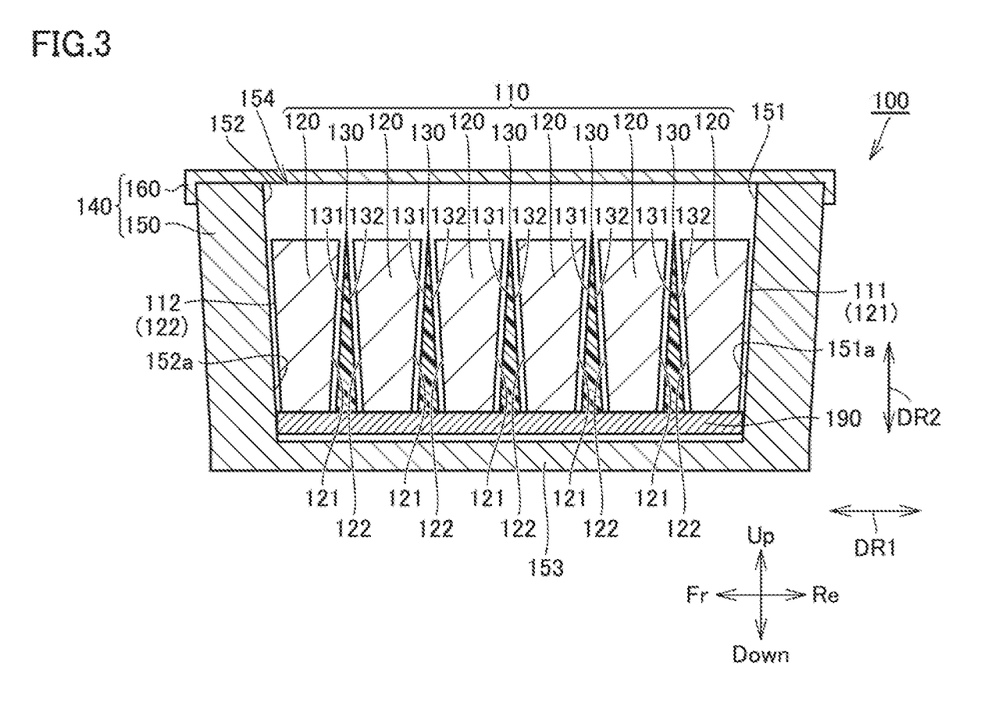
FIG. 3 is a schematic cross-sectional view of the power storage device of FIG. 2, as viewed in the direction of the arrow of line III-III.

Next, the power storage device 100 is now described. FIG. 2 is a schematic plan view of the power storage device according to Embodiment 1. FIG. 3 is a schematic cross-sectional view of the power storage device of FIG. 2, as viewed in the direction of the arrow of line III-III. As shown in FIGS. 2 and 3, the power storage device 100 according to Embodiment 1 includes a power storage stack 110, a housing case 140, and a cooler 190.

As shown in FIGS. 2 and 3, in the power storage stack 110, multiple unit cells 120 and multiple spacers 130 are alternately stacked along a first direction DR1. The housing case 140 accommodates the power storage stack 110. The housing case 140 includes a lower case 150 and an upper case 160.

Within the housing case 140, the power storage stack 110 is constrained in the first direction DR1. In other words, the power storage stack 110 is bearing a constraining load in the first direction DR1. The power storage stack 110 being constrained in the first direction DR1 regulates the positions of the unit cells 120 and the positions of the spacers 130, thereby improving the reliability of the power storage stack 110. Details of the constraining load will be described below.

The first direction DR1 is, specifically, the horizontal direction. While the power storage device 100 according to the present embodiment is described with reference to the first direction DR1 being the front-rear direction of the vehicle 1, the first direction DR1 may be the width direction of the vehicle 1.

As shown in FIG. 3, the power storage stack 110 has a first end surface 111 and a second end surface 112. The first end surface 111 and the second end surface 112 form the opposing ends of the power storage stack 110 in the first direction DR1.

In the present embodiment, for example, a single cell can be employed as each one of the unit cells 120. Examples of the single cell include a secondary battery such as a nickel-hydrogen battery or a lithium-ion battery. The single cell has, for example, a rectangular shape. The secondary battery may be one using liquid electrolyte or one using a solid electrolyte. Note that the unit cell 120 may be a chargeable/dischargeable unit capacitor.

The unit cells 120 are electrically connected to one another in series within the housing case 140. The structure for electrically connecting the unit cells 120 to one another is not shown in FIGS. 2, 3, and the subsequent figures.

The unit cells 120 are each, what is called, a rectangular battery as noted above, and they have a rectangular prism shape whose opposing end surfaces in the first direction DR1 are angled. The unit cells 120 each have a first tapered surface 121 and a second tapered surface 122. The first tapered surface 121 and the second tapered surface 122 form the opposing end surfaces of the unit cell 120 in the first direction DR1. The first tapered surface 121 and the second tapered surface 122 are angled so that the dimension between the two decreases toward one side of the second direction DR2 intersecting with the first direction DR1.

In the present embodiment, the second direction DR2 is, specifically, orthogonal to the first direction DR1. The second direction DR2 is, specifically, the vertical direction. The one side of the second direction DR2 is, specifically, the downward direction, and the other one side of the second direction DR2 is, specifically, the upward direction.

The first tapered surface 121 has a rectangular profile as viewed in a direction orthogonal to the first tapered surface 121. The second tapered surface 122 has a rectangular profile as viewed in a direction orthogonal to the second tapered surface 122. The unit cells 120 each have an upper surface and a lower surface intersecting with the second direction. The upper surface and the lower surface of the unit cell 120 each have a rectangular profile.

The first end surface 111 of the power storage stack 110 is formed of the first tapered surface 121 of the unit cell 120 that is disposed on one end of the power storage stack 110 in the first direction DR1. The second end surface 112 of the power storage stack 110 is formed of the second tapered surface 122 of the unit cell 120 that is disposed on the other end of the power storage stack 110 in the first direction DR1.

As shown in FIG. 3, the spacers 130 each have a first support surface 131 and a second support surface 132. The first support surface 131 and the second support surface 132 form the opposing end surfaces of a spacer 130 in the first direction DR1.

The first support surface 131 of each of the spacers 130 is angled corresponding to and is in contact with the first tapered surface 121 of a unit cell 120 that is adjacent to the spacer 130 on one side of the first direction DR1. The second support surface 132 of each of the spacers 130 is angled corresponding to and is in contact with the second tapered surface 122 of a unit cell 120 that is adjacent to the spacer 130 on the other side of the first direction DR1. Note that, for ease of discussion, FIGS. 2 and 3 schematically illustrate the members adjacent to each other in the first direction DR1, with a space in between.

In the present embodiment, the spacers 130 are not coupled to each other, and are spaced apart from each other. The spacers 130 may be coupled to one another within the housing case 140. In this case, preferably, the spacers 130 can each be displaceable in the first direction DR1 when a unit cell 120 is displaced out of position in the second direction DR2, as described below.

The spacers 130 are each formed of a thermoplastic resin so that when a unit cell 120 adjacent to the spacer 130 is abnormally heated, a portion of the first support surface 131 that is in contact with the first tapered surface 121 of the unit cell 120 and a portion of the second support surface 132 that is in contact with the second tapered surface 122 of the unit cell 120 can be thermally distorted. Functional effects of the spacer 130 when thermal distorted will be described below.

The housing case 140 accommodates the power storage stack 110. The housing case 140 may accommodate multiple power storage stacks 110. The housing case 140 is formed of a metallic material, such as aluminum.

The lower case 150 (the housing case 140) has a first inner surface 151, a second inner surface 152, and a bottom 153. The first inner surface 151 and the second inner surface 152 are facing each other in the first direction DR1.

The first inner surface 151 includes a first angled portion 151a. The first angled portion 151a is angled corresponding to the first tapered surface 121 of a unit cell 120 that is disposed on the one end of the power storage stack 110 in the first direction DR1. The first angled portion 151a may form a portion of the first inner surface 151, or may form the entirety of the first inner surface 151.

The second inner surface 152 includes a second angled portion 152a. The second angled portion 152a is angled corresponding to the second tapered surface 122 of a unit cell 120 that is disposed on the other end of the power storage stack 110 in the first direction DR1. The second angled portion 152a may form a portion of the second inner surface 152, or form the entirety of the second inner surface 152.

The power storage stack 110 is held by the housing case 140, with the first end surface 111 in contact with the first angled portion 151a and the second end surface 112 in contact the second angled portion 152a.

On the one (lower) side of the second direction DR2 of the power storage stack 110, the bottom 153 of the housing case 140 is facing the power storage stack 110. In the present embodiment, the power storage stack 110 and the bottom 153 are spaced apart from each other.

The lower case 150 has an opening 154 on the side opposite the bottom 153. The upper case 160 closes off the opening 154.

The cooler 190 is disposed between the bottom 153 and the power storage stack 110. The cooler 190 cools the unit cells 120. The spacers 130 are in contact with the cooler 190, thereby being positioned in the second direction DR2.

The cooler 190 may be formed of, for example, coolant piping through which a liquid refrigerant or a gas refrigerant flows.

The power storage device 100 according to Embodiment 1 is now described with reference to one example method of formation of the power storage stack 110 within the housing case 140.

Figure 4:
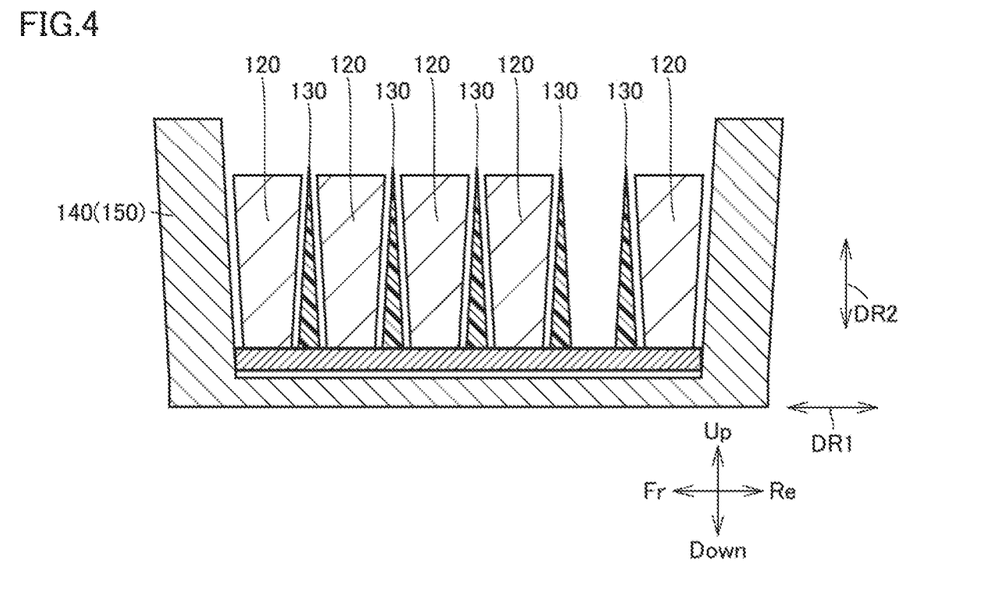
FIG. 4 is a cross-sectional view of a housing case, in which multiple unit cells and multiple spacers are disposed, except for one unit cell, according to Embodiment 1.

FIG. 4 is a cross-sectional view of a housing case in which multiple unit cells and multiple spacers disposed, except for one unit cell, according to Embodiment 1. FIG. 4 illustrates the same cross-sectional view as FIG. 3, but without the upper case 160, for convenience. As the final one unit cell 120 is accommodated within the housing case 140 of FIG. 4, a constraining force acts on the power storage stack 110 in the first direction DR1, thereby forming the power storage stack 110 according to the present embodiment as shown in FIG. 3.

As shown in FIG. 4, initially, the unit cells 120 and the spacers 130 are disposed within the housing case 140, except for one unit cell 120.

As shown in FIG. 4, since one unit cell 120 is not yet positioned, two of the spacers 130 are adjacent to each other in the first direction DR1 with no unit cell 120 in between. In the following, a description will be given with reference to disposing the final unit cell 120 between the two adjacent spacers 130. However, the final unit cell 120 may be disposed in a position that is in contact with the housing case 140 in the first direction DR1. Stated differently, the final unit cell 120 may be one that forms the first end surface 111 or the second end surface 112 of the power storage stack 110.

Figure 5:
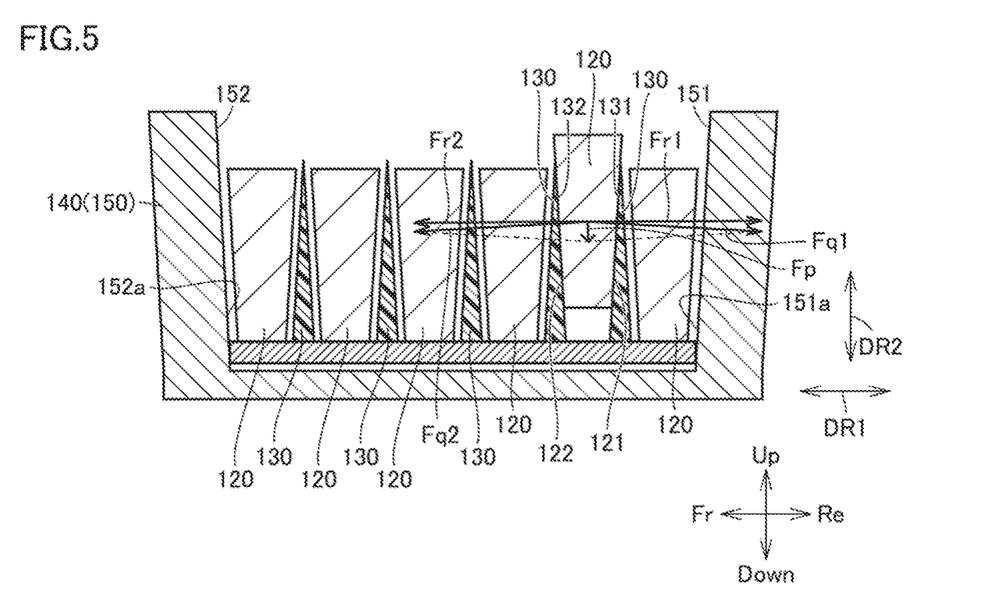
FIG. 5 is a cross-sectional view of the housing case of FIG. 4, with the final one unit cell being pressed in place into the housing case in order to form a power storage stack, according to Embodiment 1.

FIG. 5 is a cross-sectional view of the housing case of FIG. 4, with the final one unit cell being pressed in place into the housing case in order to form the power storage stack, according to Embodiment 1. FIG. 5 illustrates the same cross-sectional view as FIG. 3.

As shown in FIG. 5, the final unit cell 120 is being disposed between the adjacent two spacers 130 within the housing case 140. The final unit cell 120 is being disposed into the housing case 140 from the other (upper) side of the second direction DR2. This causes the first tapered surface 121 of the final unit cell 120 to abut the first support surface 131 of one of the two adjacent spacers 130. The second tapered surface 122 of the final unit cell 120 abuts the second support surface 132 of the other one of the adjacent two spacers 130.

At this time, the final unit cell 120 is projecting toward the other (upper) side of the second direction DR2, as compared to the other unit cells 120. The unit cells 120 and the spacers 130 illustrated in FIG. 5 are bearing an extremely small load in the first direction DR1, while the unit cells 120 and the spacers 130 according to Embodiment 1 are bearing the constraining load when all the unit cells 120 are disposed in the housing case 140. The unit cell 120 and the spacers 130 in an unloaded condition will be described below.

Then, as the final unit cell 120 projecting as mentioned above is pressed into the housing case 140 toward the one (lower) side of the second direction DR2, a force Fp to press that unit cell 120 toward the one (lower) side of the second direction DR2 is converted into a pressing force Fq1 and a pressing force Fq2, due to a wedging effect of the unit cell 120 having the first tapered surface 121 and the second tapered surface 122. The pressing force Fq1 is a force of the unit cell 120, being pressed in place, to press against the first support surface 131 of the spacer 130 that is in contact with the first tapered surface 121 of the unit cell 120 being pressed in place. The pressing force Fq2 is a force of the unit cell 120, being pressed in position, to press against the second support surface 132 of the spacer 130 that is in contact with the second tapered surface 122 of the unit cell 120 being pressed in place.

Due to a component Fr1 of the pressing force Fq1 in the first direction DR1, the spacers 130 and other unit cells 120 that are on the first tapered surface 121 side of the unit cell 120 being pressed in position bear the reaction force from the first inner surface 151 (the first angled portion 151a) of the housing case 140, and are compressed in the first direction DR1. Due to the component Fr2 of the pressing force Fq2 in the first direction DR1, the spacers 130 and other unit cell 120 that are on the second tapered surface 122 side of the unit cell 120 being pressed in position bear the reaction force from the second inner surface 152 (the second angled portion 152a) of the housing case 140, and are compressed in the first direction DR1. The unit cell 120 being pressed in position is also compressed in the first direction DR1 by the reaction force from the spacer 130, generated by the component Fr1 and the component Fr2 in the first direction DR1.

As described above, the projecting unit cell 120 squeezes in between the spacers 130 while the unit cells 120 and the spacers 130 are being compressed in the first direction DR1 in the housing case 140. This forms the power storage stack 110 according to Embodiment 1 in the housing case 140, while the power storage stack 110 is bearing the constraining load in the first direction DR1.

While the above description has been given with reference to forming the power storage stack 110 by pressing the final unit cell 120 in position between two spacers 130, it should be noted that, even if the power storage stack 110 is formed by pressing in place a unit cell 120 that is to form the first end surface 111 or the second end surface 112 of the power storage stack 110, the power storage stack 110 according to Embodiment 1 can be formed within the housing case 140 while bearing a constraining load in the first direction DR1, as with the above.

Specifically, as the unit cell 120 that is to form the first end surface 111 of the power storage stack 110 is pressed in place into the housing case 140, the first tapered surface 121 of the unit cell 120 being pressed is brought into contact with the first inner surface 151 (the first angled portion 151a). Consequently, due to a wedging effect similar to the above, the power storage stack 110 can be formed which is bearing the constraining load in the first direction DR1. When the unit cell 120 that is to form the second end surface 112 of the power storage stack 110 is pressed in place into the housing case 140, the second tapered surface 122 of the unit cell 120 being pressed is brought into contact with the second inner surface 152 (the second angled portion 152a). Consequently, due to a wedging effect similar to the above, the power storage stack 110 can be formed which is bearing the constraining load in the first direction DR1.

While the power storage stack 110 is compressed in the first direction DR1 and bearing a constraining load Ft1 in the first direction DR1, the position of the power storage stack 110 is regulated within the housing case 140.

Figure 6:
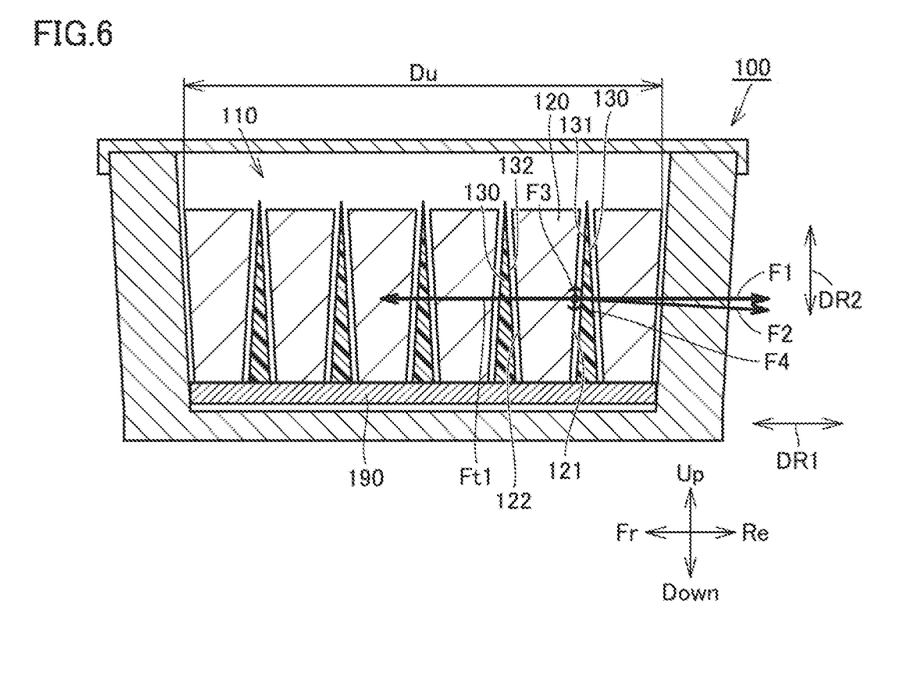
FIG. 6 is a schematic cross-sectional view illustrating a force acting on the unit cells in the power storage device according to Embodiment 1.
Figure 7:
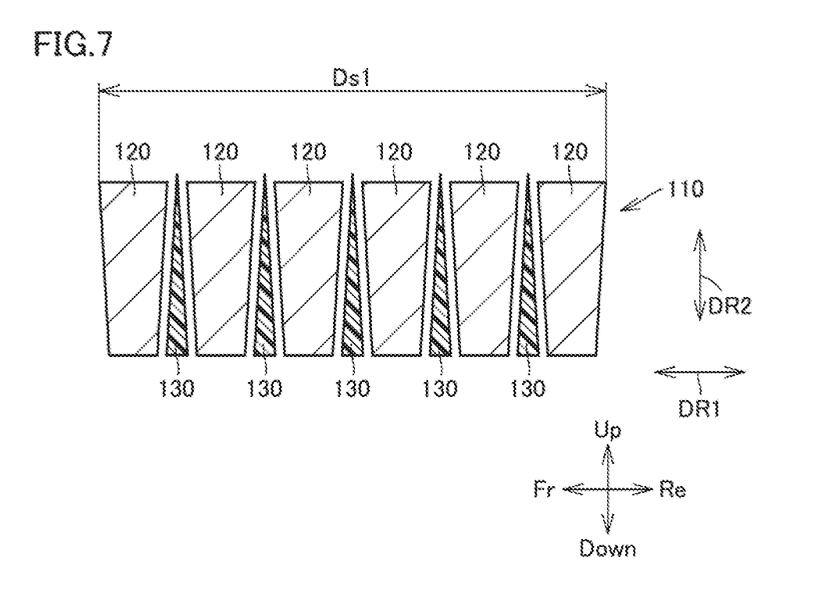
FIG. 7 is a schematic cross-sectional view illustrating the power storage stack according to Embodiment 1 in an unloaded condition.

FIG. 6 is a schematic cross-sectional view illustrating a force acting on the unit cells in the power storage device according to Embodiment 1. FIG. 7 is a schematic cross-sectional view illustrating the power storage stack according to Embodiment 1 in an unloaded condition. FIGS. 6 and 7 illustrate the power storage device 100 and the power storage stack 110, respectively, in the same cross-sectional view as FIG. 3. Moreover, for ease of discussion, FIGS. 6 and 7 schematically illustrate the members adjacent to each other in the first direction DR1, with a space in between.

Ds1>Du is satisfied, where Du is the length, in the first direction DR1, of the power storage stack 110 in the power storage device 100 according to Embodiment 1, as viewed from the other (upper) side of the second direction DR2 as shown in FIG. 6, and Ds1 is the length, in the first direction DR1, of the power storage stack 110 in an unloaded condition, as viewed from the other (upper) side of the second direction DR2 as shown in FIG. 7. Due to this, the constraining load Ft1 that is applied to the power storage stack 110 in the first direction DR1 can be represented as: Ft1≈K·(Ds1−Du), where K is a spring constant of the power storage stack 110 in the first direction DR1. In the following, for ease of illustration, the spring constant K of the power storage stack 110 is regarded as a constant value.

In the present embodiment, while the power storage stack 110 can be formed by pressing the final one unit cell 120 in place into the housing case 140 as noted above, the constraining load Ft1 can also be controlled by adjusting the force Fp to press the unit cell 120 in place into the housing case 140, as shown in FIG. 5.

Specifically, as shown in FIGS. 5 and 6, the magnitude, in the first direction DR1, of the component Fr1 (Fr2) of the pressing force Fq1 (Fq2) to press against the spacer 130 adjacent to the unit cell 120 with the force Fp to press the unit cell 120 in place can be as is the magnitude of the constraining load Ft1. Note that, in order to adjust the magnitude of the constraining load Ft1 to be small, the final unit cell 120 to be pressed may be located on the other (upper) side of the second direction DR2 relative to an end of an adjacent spacer 130 on the one (lower) side of the second direction DR2. In other words, the final unit cell 120 to be pressed may be spaced apart from the cooler 190. In this case, a heat transfer agent may be previously injected between the final unit cell 120 to be pressed in place and the cooler 190. Accordingly, in the power storage device 100 according to Embodiment 1, the heat transfer agent may be located between the cooler 190 and at least one of the unit cells 120.

Next, forces acting on the unit cell 120 according to Embodiment 1 will be described. As shown in FIG. 6, in each unit cell 120, a reaction force in a direction along the first direction DR1 is generated by the constraining load Ft1. For example, the constraining load Ft1 from the spacer 130 adjacent to a unit cell 120 on the first tapered surface 121 side generates the reaction force F1 in the first tapered surface 121. Since the first tapered surface 121 and the first support surface 131 of the spacer 130 in contact with the first tapered surface 121 are positioned non-parallel to the second direction DR2, the reaction force F1 is resolved into a force component F2 in a direction orthogonal to the first tapered surface 121 (the first support surface 131) and a force component F3 in a direction along the first tapered surface 121 (the first support surface 131). Then, since the spacer 130 is formed of a thermoplastic resin, the force component F3 causes in the first tapered surface 121 a friction force F4 in a direction opposite the direction of the force component F3. The magnitude of the friction force F4 is equal to the magnitude of the force component F3. A similar friction force is also generated on the second tapered surface 122 of the unit cell 120. As such, the positions of the unit cells 120 are regulated by these friction forces while the power storage stack 110 is bearing the constraining load Ft1. Accordingly, in the power storage device 100 according to Embodiment 1, the unit cells 120 are maintained bearing the constraining load Ft1 and the positions of the unit cells 120 are maintained regulated, without requiring the unit cells 120 to be fixedly coupled by a member, such as a restraining band.

Note that, due to the force component F2, a normal reaction that is equal in magnitude to the force component F2 is applied to the unit cell 120 from the first support surface 131 of the spacer 130. Due to this, the maximum static friction force between the first tapered surface 121 and the first support surface 131 is $\mu \cdot F2$, where $\mu$ is a coefficient of static friction between the first tapered surface 121 of the unit cell 120 and the first support surface 131 of the spacer 130. The power storage device 100 according to Embodiment 1 is configured to satisfy $F4 < \mu \cdot F2$.

Next, the power storage device 100 according to Embodiment 1 will be described in the case where one of the unit cells 120 is abnormally heated. As shown in FIG. 6, when a unit cell 120 is abnormally heated, the first support surface 131 of the spacer 130 that is in contact with the first tapered surface 121 of that unit cell 120 is heated. This thermally distorts the first support surface 131 of the spacer 130 formed of a thermoplastic resin, resulting in a reduction of the coefficient of static friction $\mu$ between the first tapered surface 121 of the unit cell 120 and the first support surface 131 of the spacer 130. The reduction of the coefficient of static friction $\mu$ reduces the maximum static friction force ($\mu \cdot F2$) between the first tapered surface 121 and the first support surface 131.

As the maximum static friction force ($\mu \cdot F2$) decreases small enough to satisfy $\mu \cdot F2 < F3$, the friction force F4 is in turn equal to the maximum static friction force ($\mu \cdot F2$), and the force component F3 is in turn greater than the friction force F4 which is now the maximum static friction force. This causes the unit cell 120 to move along the direction of the force component F3. In other words, the unit cell 120 slides along the first support surface 131, with the first tapered surface 121 in contact with the first support surface 131. Similarly, in a spacer 130 that is in contact with the second tapered surface 122 of the abnormally-heated unit cell 120, the second support surface 132 is thermally distorted, and the maximum static friction force is thereby reduced, causing, as with the first tapered surface 121, the unit cell 120 to slide along the second support surface 132, with the second tapered surface 122 in contact with the second support surface 132.

As described above, in the case where one of the unit cells 120 in the power storage stack 110 is abnormally heated, the unit cell 120 is displaced to the other (upper) side of the second direction DR2.

Figure 8:
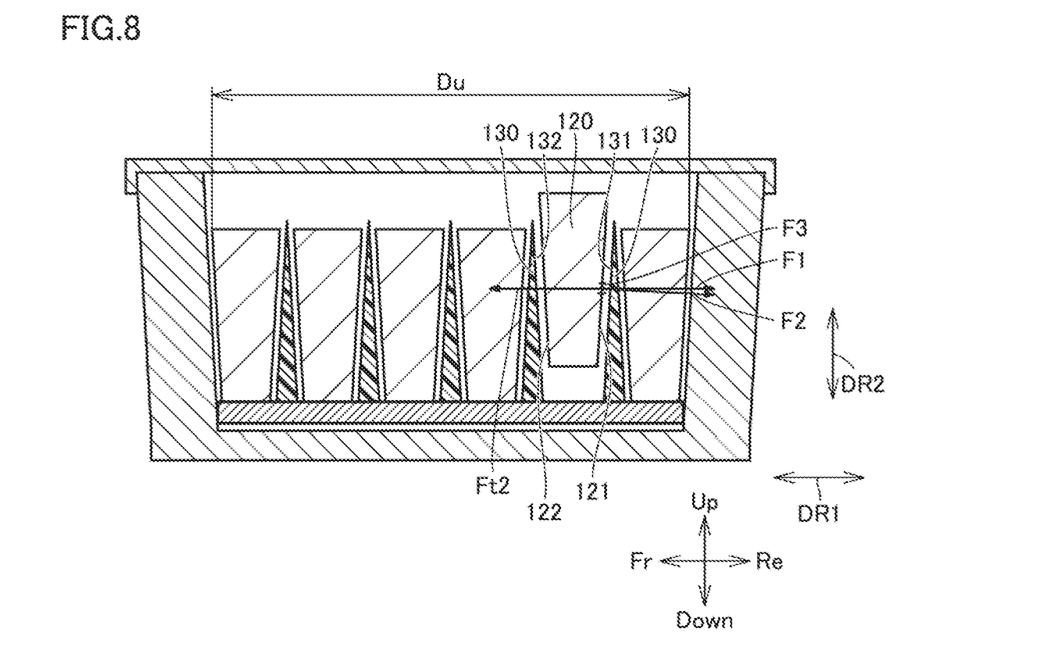
FIG. 8 is a schematic cross-sectional view of the power storage device with an abnormally-heated unit cell displaced out of position, according to Embodiment 1.
Figure 9:
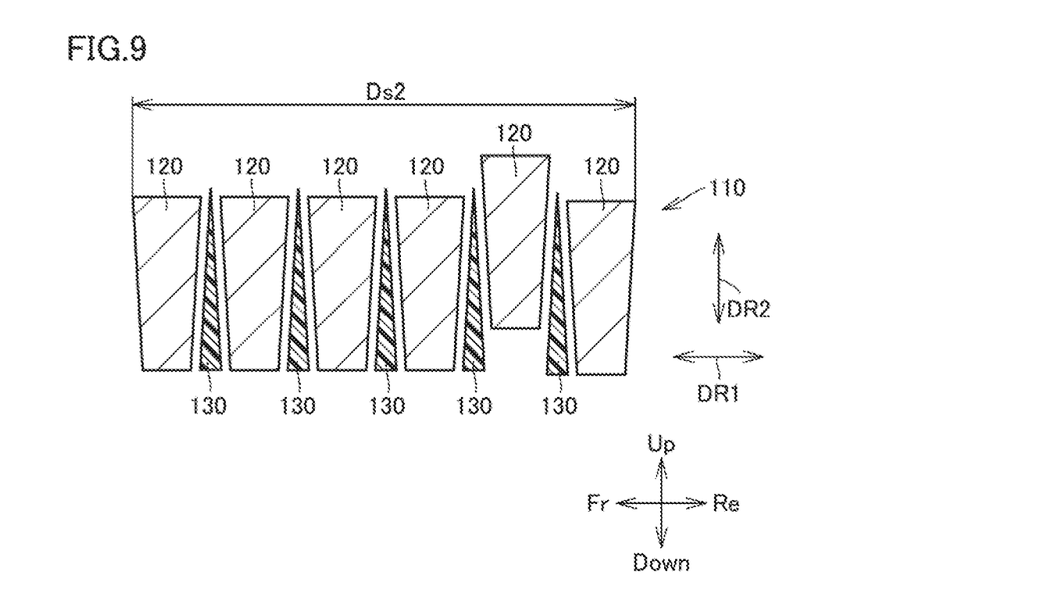
FIG. 9 is a schematic cross-sectional view of the power storage stack in an unloaded condition in a first direction while an abnormally-heated unit cell is kept displaced out of position in the second direction, according to Embodiment 1.

FIG. 8 is a schematic cross-sectional view illustrating the power storage device in which an abnormally-heated unit cell is displaced out of position, according to Embodiment 1. FIG. 9 is a cross-sectional view schematically illustrating the power storage stack in an unloaded condition in the first direction, while an abnormally-heated unit cell is kept displaced out of position in the second direction, according to Embodiment 1. FIGS. 8 and 9 illustrate the power storage device 100 and the power storage stack 110 in the same cross-sectional view as FIG. 3. For ease of discussion, FIGS. 8 and 9 schematically illustrate the members adjacent to each other in the first direction DR1, with a space in between.

As shown in FIG. 8, the first tapered surface 121 and the second tapered surface 122 of each unit cell 120 are angled so that a dimension between the two decreases toward the one (lower) side of the second direction DR2. Consequently, as an abnormally-heated unit cell 120 is displaced to the other (upper) side of the second direction DR2, Ds2<Ds1 is satisfied, where Ds2 is the length of the power storage stack 110 in the first direction DR1 as viewed from the other (upper) side of the second direction DR2 when the power storage stack 110 is in an unloaded condition in the first direction DR1 while the abnormally-heated unit cell 120 is maintained projected in the second direction DR2, as shown in FIG. 9, and Ds1 is the length of the power storage stack 110 in the first direction DR1 as viewed from the other (upper) side when the power storage stack 110 is in an unloaded condition in the first direction DR1 and no unit cell 120 is abnormally heated, as shown in FIG. 7.

Then, as shown in FIGS. 8 and 9, the constraining load Ft2 that is applied to the power storage stack 110 in the first direction DR1 while an abnormally-heated unit cell 120 is displaced out of position can be represented as $Ft2 \approx K \cdot (Ds2 - Du)$. Here, since Ds2 is less than Ds1 as noted above, $K \cdot (Ds2 - Du) < K \cdot (Ds1 - Du)$, that is, $Ft2 < Ft1$ is satisfied. As such, the constraining load applied to the power storage stack 110 in the first direction DR1 is reduced by the unit cell 120 being displaced out of position, as described above. The reduction in the constraining load reduces the thermal conductivity within the power storage stack 110 in the first direction DR1. Accordingly, conduction of heat from a heated unit cell 120 to other unit cells 120 can be inhibited.

As noted above, in the power storage device 100 according to Embodiment 1, the first support surface 131 of each of the spacers 130 is angled corresponding to and is in contact with the first tapered surface 121 of a unit cell 120 that is adjacent to the spacer 130 on the one side of the first direction DR1. The second support surface 132 of each of the spacers 130 is angled corresponding to and is in contact with the second tapered surface 122 of a unit cell 120 that is adjacent to the spacer 130 on the other side of the first direction DR1. The spacers 130 are each formed of a thermoplastic resin.

This causes a friction force between the tapered surface of the unit cell 120 and at least one of the first support surface 131 and the second support surface 132 of the spacer 130 formed of a thermoplastic resin. This inhibits the unit cell 120 from being displaced out of position in the second direction DR2 by a constraining force acting on the power storage stack 110 in the first direction DR1. The power storage stack 110 can, in turn, maintain the constraining force bearing state. Furthermore, if any one of the unit cells 120 is abnormally heated, at least one of the first support surface 131 and the second support surface of the spacer 130, formed of a thermoplastic resin, adjacent to the unit cell 120 is thermally distorted. This reduces the friction coefficient between the first support surface 131 (the second support surface 132) of the spacer 130 and the first tapered surface 121 (the second tapered surface 122) of the unit cell 120. Due to this, the constraining force is applied to the heated unit cell 120, which, in turn, slides on the first support surface 131 (the second support surface 132) of the spacer 130 and is displaced out of position in the second direction DR2. The heated unit cell 120 being displaced out of position reduces the constraining force. The reduction in the constraining force can inhibit the conduction of heat from the abnormally-heated unit cell 120 to other unit cells 120 within the power storage stack 110.

Moreover, in the power storage device 100 according to Embodiment 1, the first angled portion 151a is angled corresponding to the first tapered surface 121. The second inner surface 152 includes the second angled portion 152a. The second angled portion 152a is angled corresponding to the second tapered surface 122. The power storage stack 110 is held by the housing case 140, with the first end surface 111 in contact with the first angled portion 151a and the second end surface 112 in contact with the second angled portion 152a. This allows the power storage stack 110 to be held within the housing case 140, without having to provide another member, such as an end plate, between the first end surface 111 and the first inner surface 151 and between the second end surface 112 and the second inner surface 152.

Moreover, in the power storage device 100 according to Embodiment 1, the spacers 130 are in contact with the cooler 190, thereby being positioned in the second direction DR2. This stabilizes the position of the entirety of the power storage stack 110 in the second direction DR2, which, in turn, improves the reliability of the power storage device 100.

Embodiment 2

In the following, a power storage device according to Embodiment 2 is described. The power storage device according to Embodiment 2 is primarily different from Embodiment 1 in terms of a method of positioning of spacers in a second direction. Thus, description of the same configuration as Embodiment 1 will be omitted.

Figure 10:
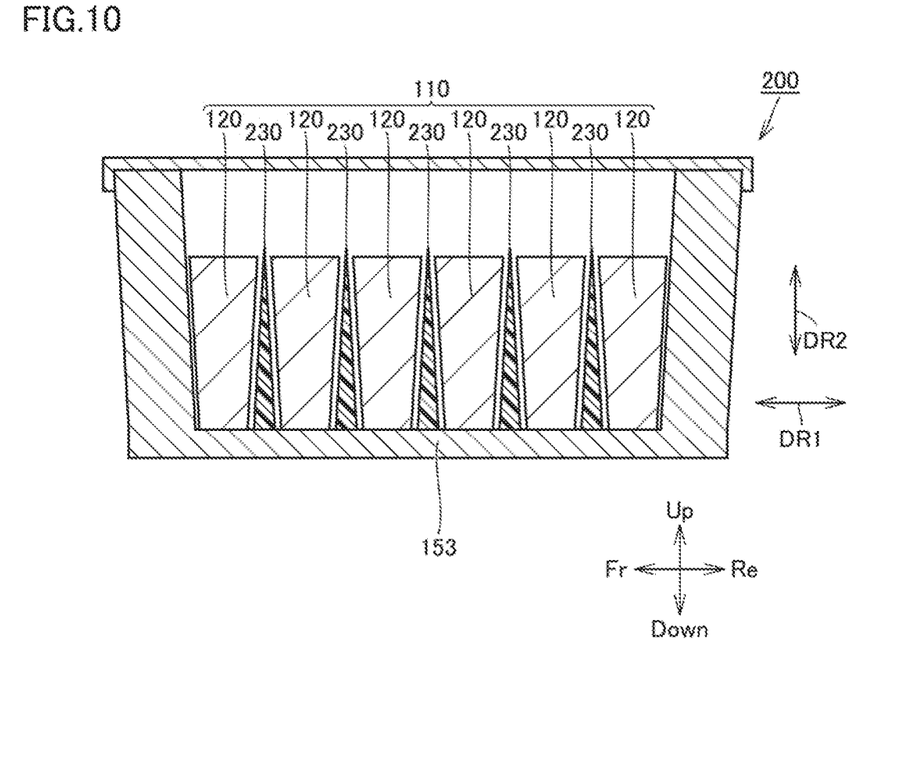
FIG. 10 is a schematic cross-sectional view of a power storage device according to Embodiment 2.

FIG. 10 is a schematic cross-sectional view of the power storage device according to Embodiment 2. FIG. 10 illustrates the same cross-sectional view as FIG. 3. FIG. 10 also schematically illustrates the members adjacent to each other in a first direction DR1, with a space in between.

As shown in FIG. 10, in a power storage device 200 according to Embodiment 2, no cooler is disposed between a power storage stack 110 and a bottom 153.

Due to this, in the power storage device 200 according to Embodiment 2, spacers 230 are in contact with the bottom 153, thereby being positioned in a second direction DR2. Due to this, since the spacers 130 are positioned in the second direction DR2 also in the present embodiment, the position of the entirety of the power storage stack 110 is stabilized in the second direction DR2, which, in turn, improves the reliability of the power storage device 100.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. A power storage device, comprising:
a power storage stack in which a plurality of unit cells and a plurality of spacers are alternately stacked along a first direction, wherein each of the plurality of unit cells has a rectangular prism shape;
a housing case accommodating the power storage stack; and
a cooler disposed in the housing case for cooling the plurality of unit cells, wherein
the power storage stack is constrained in the first direction within the housing case,
each unit cell among the plurality of unit cells has a first tapered surface and a second tapered surface that are angled so that a dimension between the first tapered surface and the second tapered surface of the unit cell decreases toward one side of the plurality of unit cells in a second direction that is orthogonal with the first direction and from another side of the plurality of unit cells in the second direction, wherein the one side of the plurality of unit cells is a lower side of the plurality of unit cells in a vertical direction, wherein the second direction is in the vertical direction, the first tapered surface and the second tapered surface forming opposing end surfaces of the unit cell in the first direction,
each spacer among the plurality of spacers has a first support surface and a second support surface forming opposing end surfaces in the first direction,
the first support surface of each spacer of the plurality of spacers is angled throughout from one side to another side of the plurality of spacers in the second direction and is in direct contact with the first tapered surface of the unit cell that is adjacent to the spacer on one side of the first direction, wherein the one side of the plurality of spacers is a lower side of the plurality of spacers in the vertical direction,
the second support surface of each spacer of the plurality of spacers is angled throughout from the one side to the another side of the plurality of spacers in the second direction and is in direct contact with the second tapered surface of the unit cell that is adjacent to the spacer on the other side of the first direction,
the plurality of spacers are each formed of a thermoplastic resin,
the power storage stack has a first end surface and a second end surface forming opposing end surfaces of the power storage stack in the first direction, the first end surface of the power storage stack is formed of the first tapered surface of the unit cell that is disposed on one end of the power storage stack in the first direction, the second end surface of the power storage stack is formed of the second tapered surface of the unit cell that is disposed on the other end of the power storage stack in the first direction, the housing case has a first inner surface and a second inner surface facing each other in the first direction, the first inner surface includes a first angled portion angled corresponding to an entirety of the first tapered surface, the second inner surface includes a second angled portion angled corresponding to an entirety of the second tapered surface, and the power storage stack is held by the housing case, with the first end surface in direct contact with the first angled portion and the second end surface in direct contact with the second angled portion, wherein the cooler is disposed between a third inner surface of the housing case and the one side of the plurality of unit cells in the second direction, so that the cooler is in physical and direct contact with the one side of the plurality of unit cells in the second direction and is in physical and direct contact with the one side of the plurality of spacers in the second direction.

2. The power storage device according to claim 1, wherein at least one of the plurality of unit cells is configured to slide on at least one of the first support surface and the second support surface, while in direct contact with the at least one of the first support surface and the second support surface, so as to be displaced out of position in the second direction with respect to the power storage stack.

3. The power storage device according to claim 1, wherein the another side of each of the plurality of spacers has a tip that protrudes in the second direction relative to the another side of the plurality of unit cells.

\* \* \* \* \*